UNITED STATES PATENT OFFICE.

AQUILLA T. LAWRENCE, OF IDAHO SPRINGS, ASSIGNOR OF ONE-HALF TO JOHN W. GILBERT, OF GEORGETOWN, COLORADO.

SALVE.

SPECIFICATION forming part of Letters Patent No. 240,150, dated April 12, 1881.

Application filed November 3, 1880. (Specimens.)

*To all whom it may concern:*

Be it known that I, AQUILLA T. LAWRENCE, a citizen of the United States, residing at Idaho Springs, in the county of Clear Creek and State of Colorado, have invented a new and useful composition of matter to be used for curing saddle or harness galls, diseases of the hoof, and sores, of which the following is a specification.

Said composition consists of the following ingredients, combined in the proportions stated, viz: rosin, one pound; lard, one pound; white gum-turpentine, one pound; gum-camphor, four ounces; sugar of lead, two ounces; sulphate of zinc, two ounces; fresh hens' eggs, ten. These ingredients are to be heated and thoroughly mingled by agitation.

In using the above-named composition the wound or sore should first be thoroughly cleansed by washing. The composition should then be applied as an ointment.

I am not aware that all of the ingredients of said composition, in the proportions stated, have been used together for the same purpose, nor that any similar composition has been used or patented.

What I claim, and desire to secure by Letters Patent of the United States, is—

The herein-described composition of matter to be used for curing saddle or harness galls, diseases of the hoof, and sores, consisting of rosin, lard, gum-camphor, white gum-turpentine, sugar of lead, sulphate of zinc, and fresh hens' eggs, in the proportions specified.

AQUILLA T. LAWRENCE.

Witnesses:
E. J. ASHMORE,
A. SANDLOWSKY.